(12) United States Patent
Tipton

(10) Patent No.: US 6,902,678 B2
(45) Date of Patent: Jun. 7, 2005

(54) BILGE WATER RECLAMATION SYSTEM AND PROCESS

(76) Inventor: Gary A. Tipton, 14910 Welcome La., Houston, TX (US) 77014

( * ) Notice: Subject to any disclaimer, the term of this patent is extended or adjusted under 35 U.S.C. 154(b) by 65 days.

(21) Appl. No.: 10/675,682

(22) Filed: Sep. 30, 2003

(65) Prior Publication Data

US 2004/0060876 A1 Apr. 1, 2004

Related U.S. Application Data

(60) Provisional application No. 60/414,810, filed on Sep. 30, 2002.

(51) Int. Cl.$^7$ ............................. C02F 1/463; C02F 1/78; C02F 9/00
(52) U.S. Cl. ..................... 210/748; 210/760; 210/770; 210/195.1; 210/202; 210/540; 204/560
(58) Field of Search ................................. 210/721, 748, 210/760, 800, 805, 806, 195.1, 198.1, 202, 243, 540; 204/559, 560, 660

(56) References Cited

U.S. PATENT DOCUMENTS

| | | |
|---|---|---|
| 3,969,245 A | 7/1976 | Ramirez |
| 5,178,755 A | 1/1993 | LaCrosse |
| 5,234,606 A | 8/1993 | Karzama et al. |
| 5,560,831 A | 10/1996 | Bladen et al. |
| 5,679,257 A | 10/1997 | Coate et al. |
| 5,728,303 A * | 3/1998 | Johnson ....................... 210/695 |
| 5,888,403 A | 3/1999 | Hayashi |
| 6,027,653 A | 2/2000 | Holland |
| 2002/0020631 A1 * | 2/2002 | Gavrel et al. ............... 205/752 |
| 2003/0173300 A1 * | 9/2003 | Bradley ..................... 210/665 |

FOREIGN PATENT DOCUMENTS

WO  WO 00/61505 A1 * 10/2000

* cited by examiner

Primary Examiner—Frank M. Lawrence
(74) Attorney, Agent, or Firm—Keeling Hudson, LLC; Kenneth A. Keeling

(57) ABSTRACT

A system and method for treating and removing hydrocarbon and other contaminants in bilge and ballast water, utilizing a multiple progressive process that chemically and electrically treats-and removes contaminants. Wastewater, received by a sump, is transmitted to a holding tank and treated, over a period of time while-influent wastewater continues off loading. The wastewater is pumped to an oil/water separator tank that decants free-floating oil from the wastewater to an oil retention tank. The wastewater then undergoes an electrocoagulation process where emulsions are broken and compounds that further aid treatment are created. The treated water flows to a retention/separation tank where contaminant particles coalesce and separate. Water is decanted and transferred to a clean water holding tank through an ozone injection system and an activated carbon filter. Treated water is recirculated until it exits the system meeting discharge limits for organics and metals allowing release into the environment.

21 Claims, 1 Drawing Sheet

BILGE WATER RECLAMATION SYSTEM AND PROCESS

CROSS-REFERENCE TO RELATED APPLICATIONS

This application claims the benefit of the filing date of U.S. Provisional Patent application No. 60/414,810 filed in the United States Patent and Trademark Office on Sep. 30, 2002.

STATEMENT REGARDING FEDERALLY SPONSORED RESEARCH OR DEVELOPMENT

Not Applicable.

BACKGROUND OF THE INVENTION

1. Field of the Invention

This invention relates to a process to treat a fluid column by removing organics, metals and other non-organic contaminants, and provides discharge within regulatory and environmental limits. The invention includes design of an improved electrical treatment process, a process flow allowing rapid and economical treatment of a contaminated fluid column. The invention also includes a process for regenerating activated carbon as an active unit of the treatment process.

2. Description of the Related Art

Processes to treat water contaminated with dissolved and suspended organic materials have existed for many years. One of the largest contributors to contamination of the world's beaches is the dumping of bilge water at sea. The hydrocarbons contained in bilge water are one of the many sources of tar balls that show up on the beaches. A very small amount of hydrocarbons dissolved in seawater will adversely affect plankton population.

A wide variety of chemical and mechanical processes have been developed to treat contaminated fluid columns. Typically, techniques known to the prior art attempt to remove the dissolved and suspended contaminants utilizing chemical or mechanical processes to coalesce the impurities allowing removal by filtration, centrifuges, separators, or clarifiers. Prior art processes attempt to remove hydrocarbons by absorption, oxidation or ultra-filtration. Some patents that disclose such efforts are as follows:

U.S. Pat. No. 3,969,245, issued to Ramirez on Jul. 13, 1976, teaches an electrocoagulation system for removing pollutants from wastewater including: flowing wastewater through an electrocoagulation cell having rod-shaped electrodes to produce an embryo floc; treating the wastewater with a flocculent to form a full floc; creating laminar flow and skimming the floc.

U.S. Pat. No. 5,178,755, issued to LaCrosse on Jan. 12, 1993, teaches an ultraviolet enhanced ozone wastewater treatment system including: mixing ozone with wastewater; removing suspended solids in a multi-stage clarifier; exposing clarified effluent to ultraviolet radiation (to reduce bacteria and generate OH radicals); recirculating the effluent for additional ozone injection and UV irradiation, and filtering effluent.

U.S. Pat. No. 5,234,606, issued to Karazma et al. on Aug. 10, 1993, teaches a method for treating water polluted by organic chlorine compound including: adding oxidizing agent to raw water disinfect bacteria; removing suspended solids; irradiating the raw water with ultraviolet rays to decompose organic chlorine compounds, and reducing residual oxidizing agents by activated carbon and catalytic resin.

U.S. Pat. No. 5,560,831, issued to Bladen et al. on Oct. 1, 1996, teaches a method for washing agricultural products including feeding water containing contaminants washed from agricultural products to a series of coagulation steps (feeding the underflow of the second and successive compartments); treating ultimate underflow with ozone and recirculating underflow to wash agricultural products.

U.S. Pat. No. 5,679,257, issued to Coate el al. on Oct. 21, 1997, teaches a wastewater system including adjusting PH value; applying ozone and ultrasound; applying ozone and ultraviolet light, and applying a magnetic field and an electrochemical process. The system further includes filtering steps.

U.S. Pat. No. 5,888,403, issued to Hayashi on Mar. 30, 1999, teaches a wastewater treatment system including an ozone mixer, a magnetic force, a filter, a second ozone mixer, a second magnetic force, an activated carbon reaction vessel and a second filter.

U.S. Pat. No. 6,027,653 issued to Holland on Feb. 22, 2000 teaches the utilization of a solidifying organic polymer-based filtration media and activated carbon placed in separate containers and arranged in an in-line, two phase process to extract organic compounds and metals from feed streams containing emulsified or suspended concentrations of organic contaminants by absorbing and solidifying the organics into an easily retrievable, disposable mass.

Prior art methods have met with some success, however, they do not achieve the level of success of the system of current invention, which includes, among other things, injection of ozone prior to an electrocoagulation processing and re-circulation of the treated wastewater to re-charge an activated hydrocarbon filter.

BRIEF SUMMARY OF THE INVENTION

Wastewater, such as bilge water, ballast water, and production pit waters with organic contaminants, is discharged to a sump located within a bermed area. By receiving the wastewater into a sump area, the bilge water input flow rate is independent of the treatment rate. The sump also allows for isolation of the wastewater from the environment by having the hydraulic column below the input point and berm wall. The wastewater is then pumped to a holding tank, typically capable of handling a day's operational volume. The wastewater is then pumped to an oil-water separator, where the oil is removed from the wastewater and decanted to a waste oil storage tank for pickup and recycling.

The remaining wastewater is pumped through an electrocoagulation process. The electrocoagulation process employs various sacrificial metals to coalesce the suspended and dissolved organics and inorganics. The electrocoagulation treated water is then transferred to a retention tank to give the contaminants time to coalesce and separate. The wastewater is decanted to a clean water holding tank through an activated carbon filtration media. The activated carbon absorbs any remaining organics and acts as a filter for any solids present.

Ozone is injected at two points in the process. A small amount of ozone is injected prior to the electrocoagulation process. Some organics affect the electrocoagulation process. Injection of ozone reduces these contaminants and facilitates the electrocoagulation process. Ozone is also injected prior to the activated carbon. The ozone oxidizes the organics present in the wastewater. This reduces the load on the activated carbon. Water in the clean water-holding tank is circulated continuously through the activated carbon and the ozone injection zone. As the organics are reduced, the ozone will react with the organics captured by the activated carbon. This will purge the activated carbon extending the life of the activated carbon.

Sludge from the retention tank is periodically removed and treated for disposal. The sludge is pumped from the retention tank to a filter press, vacuum box or other methods to remove associated water. The sludge is optionally pumped to a mixer for further treatment, as required.

DESCRIPTION OF THE INVENTION

Figure 1:
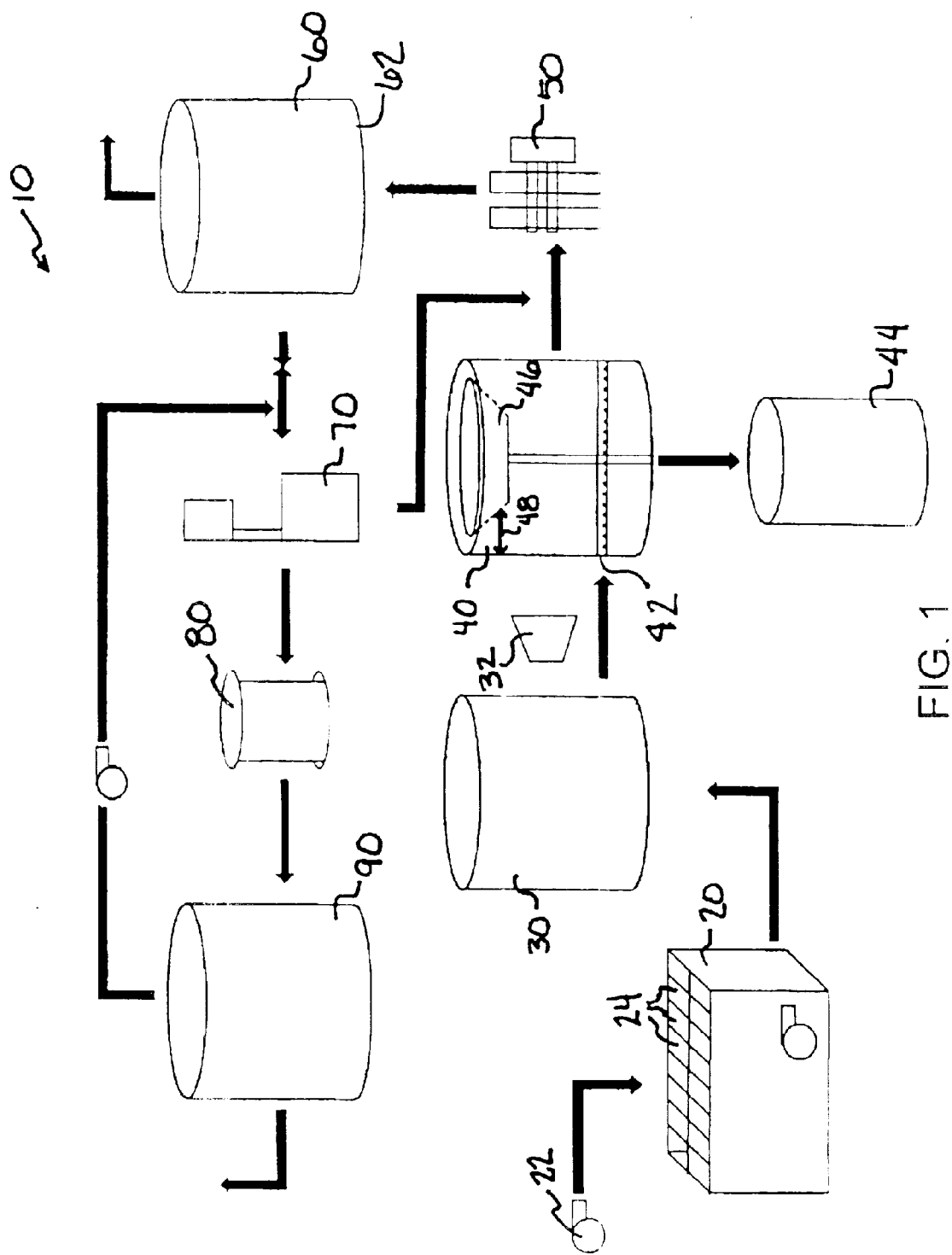
FIG. 1 is a flow diagram of a waste water system of the invention.

FIG. 1 depicts the inventive bilge water treatment system 10. The bilge water treatment system 10 comprises a sump 20, a holding tank 30, an oil/water separator 40, at least one electrocoagulation cell 50, a separation/retention tank 60, an ozone generator 70, a carbon filter 80, and a discharge tank 90. The process for treating bilge water includes receiving wastewater influent, separating oil from the wastewater, injecting ozone into the wastewater, using electrocoagulation to treat the wastewater, retaining the waste water to separate any flocculant and agglomeration, injecting more ozone into the waste water, filtering the waste water through activated carbon, treating sludge and discharging clean water.

Wastewater influent. A few of the most important factors to consider in receiving the wastewater such as bilge and ballast water is to reduce the time required to offload, to accept a variety of delivery methods, and to protect against spillage or environmental contamination. Several steps are required to achieve these goals. Multiple manifold ports 24 are set up to receive the incoming wastewater. This allows multiple offloading. A positive displacement pump 22 is located inside the berm (not shown) of the treatment plant. The manifold ports 24 have various adapters (not shown) allowing a variety of connections. The pump 22 produces a vacuum and lifts the wastewater from the vessel over the berm (not shown) to a sump 20, thus reducing the likelihood of a release to the environment. A sump tank 20 is used to isolate the wastewater in the bermed area from the environment. By utilizing a sump 20 below grade, hydraulic pressure cannot push the water up and out of the bermed area. The wastewater is pumped to a holding tank 30. This allows a larger volume of wastewater to be received during a treatment cycle. Should a pump or tank fail, the bermed area will contain the wastewater. There is no path outside of the containment area.

Treatment Phase I—Oil/Water Separation. A large component of bilge water and ballast water is free floating hydrocarbons. Removal of the free-floating hydrocarbons will allow the remainder of the process to operate more efficiently. This is accomplished by utilizing an oil/water separator 40. The wastewater is pumped into a location 42 near the bottom of oil/water separator 40 through a diffuser 32 to slow the velocity. The volume of the separator 40 is sized to provide sufficient retention time for separation. Much of the suspended hydrocarbons will agglomerate and rise to the top of the tank 40 if minimal energy, such as fluid velocity, is applied to the fluid column. In addition to the diffuser 32, baffles (not shown) are used to reduce the system energy. The hydrocarbons are allowed to rise and are decanted from the top of the separator tank 40 to a waste oil retention tank 44. Because the wastewater is pumped into the bottom 42 of oil/water separator 40, the rising hydrocarbons may be decanted from the top of oil/water separator 40. When wastewater is encountered during the decanting process, the decanting process is halted by stopping the pumping operation.

In order to decant as much oil as possible before wastewater is encountered, an insert 46 is placed in the top of the separator tank 40 to provide maximum differentiation of the oil/water column. Insert 46 is shaped such that the space 48 between insert 46 and the inside wall of oil/water separator 40 is reduced near the top of insert 46. By reducing the volume in the top portion of the oil/water separator 40, the surface area of the hydrocarbons floating on the top of the wastewater is reduced while the depth of the hydrocarbons in increased. This results in a greater vertical separation of the hydrocarbon/water interface. After being decanted from the wastewater, the hydrocarbons are stored until they can be processed for recycling.

Treatment Phase II—Ozone. An electrocoagulation process will be utilized in phase III. Electrocoagulation, however, has little effect on light-end hydrocarbons, alcohols and other aromatics. One of the limitations of the electrocoagulation process is the inability to place metal ions into the wastewater. Current flow between electrodes of the electrocoagulation process is composed of electrons flowing to the positive electrode and metal ions flowing to the negative electrode. When contaminants act as a conduit for electron flow, the current flow is composed of mostly electrons. This reduces the metal ions available to affect treatment of the wastewater. To enhance phase III treatment of the decanted wastewater, a small amount of the ozone from the ozone generator 70 is diverted and injected through a venturi (not shown) into the wastewater prior to the electrocoagulation process. Ozone reacts slowly with complex aromatics and saturated aliphatics but will degrade many organic compounds, such as phenols and alcohols. Ozonation also results in polar and charged molecules that can react with polyvalent aluminum, created by the electrocoagulation process, to form precipitates. The end result is a decrease in turbidity, improved settlability and a reduction in the number of particles. Pre-ozonation destabilizes the colloids thus requiring less metal ion input from the electrocoagulation process 50. This also facilitates oxidation and removal of the inhibiting contaminants allowing the phase III process to operate more efficiently.

Treatment Phase III—Electrocoagulation. Some dissolved and suspended organics and inorganics remain in the wastewater. Additional steps are required to remove these contaminants prior to discharge.

Organic compounds remain in solution through several mechanisms. Mechanical agitation will shear the oil-water interface, creating small oil droplets, which become dispersed in the wastewater. Since systems drift towards a lower energy state, these droplets moving around as a result of convection, will normally coalesce, forming successively larger droplets, and eventually settle (or float) out of suspension.

Surfactants, present in the wastewater, gravitate toward the oil-water interface. A thin molecular coating of surfactants is adsorbed onto the surface of the oil droplet, resulting in such a polarization, that the droplets will repel each other and remain in a dispersed state. Smaller oil droplet size results in greater surface area and thus, a greater tendency to form a stable dispersion or emulsion, which can be difficult to remove from the wastewater.

The mechanism by which an electromotive force reduces the main stabilizing force of an emulsion is known as electrostriction. Under the influence of the electromagnetic field and electron flow created by the electrocoagulation process 50, the adsorbed ions, supplied by the surfactant and giving the oil droplet its surface charge, are less tightly held, and respond by moving over the droplet surface. This surface ion migration results in the formation of a dipolar charge on the oil droplets, which now can agglomerate under the force of mutual electrostatic attraction. Additionally, the dipolar droplets moving toward oppositely charged electrodes and in opposite directions can now collide and agglomerate until reaching a point where buoyancy overcomes their repulsive forces.

The electrocoagulation process 50 also generates small amounts of oxygen, hydrogen, and hydroxide radicals. This will further oxidize remaining hydrocarbons.

Colloids that remain in the wastewater are solid particles that remain suspended in water due to their small size and the forces acting upon them. In most cases, their size is 100 nanometers or less. The particles tend to carry a surface electrical charge. These repulsive forces (Stem Forces) along with other forces such as Browning motion act to prevent the colloids from approaching close enough to interact with other particles (Van der Waal forces) to form floc of sufficient size allowing gravitational forces to settle the floc. Thus, the particles will remain in suspension. The electrocoagulation process that results in removal of the remaining colloids consists of neutralizing the repulsive charges by placing ions or free radicals into the liquid. The result is a reduction of the repulsive forces allowing the colloids to coalesce and form a floc.

Flocculation incorporates coagulation of colloids along with other chemical processes such as metal oxide and hydroxide formation. These reactions form a stable floc that will settle out. Flocculation and separation by electrocoagulation is accomplished by three processes:

1. Double Layer Compression—the layers of ions of opposing charges surrounding the colloid particle are compressed by addition of large amounts of an electrolyte, reducing the sphere of influence of these charges and allowing them to approach close to the other colloids. This is achieved electrically by production of ions at the anode during oxidation.

2. Charge Neutralization—Inorganic coagulants (usually Al and Fe++) are applied to reduce surface charges on the colloid, which allows particle agglomeration. This involves absorption of a charged coagulant on the surface of the colloid, neutralizing the charge of the colloid's surface layer. The reduction of the surface charges allows particle agglomeration.

3. Bridging—In conventional applications, polymers or polyelectrolytes cause the formation of threads or fiber, which capture or bind colloids together in a bridging action to sweep the contaminants from the liquid. This occurs as a result of the large floc formation generated by the electrocoagulation process. The electrocoagulation process also applies chemical precipitation. As atoms are released from a material, they form individual particles of dissociated ions in a solution. During electrocoagulation the process of dissolution is a result of the electrical forces applied to the solution. These ions can have a positive or negative charge. The positive charges are usually dissolved metals (cations) and are classified as inorganics. The negative charges are classified as organics or non-metals (anions). Once in solution the cations and anions are attracted to opposite charged ions in solution or to a source of charges such as the electrocoagulation plates.

This bridging process is described in the field as three separate reactions, cumulatively called migration. The first reaction includes the removal of positive ions, typically metal, from the electrocoagulation plates. As the positive ions, typically iron, aluminum or other metals, are released into the wastewater, the inorganic cations actively react with the contaminants in solution to form floc. Floc may be removed from the wastewater either by settling or by decanting.

The second reaction is electron interchange. During this reaction, electrons flow through the wastewater between the electrocoagulation plates, destabilizing some contaminants. It is this energy transfer that is required to initiate chemical reactions. This energy weakens the bond energy that holds molecules together. This weakened state allows other reactions to occur in the solution, which may cause the formation of a mass that may be removed from the wastewater The third reaction is electrolysis. In the electrocoagulation process, most of the chemical reactions occur at the charge plates. The principal reaction is a reduction zone at the cathode, where hydrogen is formed, and an oxidation zone at the anode, where oxygen and hydroxide are formed. These reactions facilitate a phase change for the dissolved contaminants. Contaminants that react with the oxygen, hydrogen or hydroxide flocculate at the electrocoagulation plates and may settle out or be decanted. Metals will form metal oxides or hydroxides and in some instances nitrates will form ammonia. The created floc and separated hydrocarbons are processed in the phase IV separation/retention tank 60.

Treatment Phase IV—Retention/Separation. The flocculation and agglomeration of contaminants requires a minimum of thirty minutes to form and begin the separation process. To accomplish this, the decanted and electrocoagulation treated wastewater is pumped into a retention/separation tank 60. The retention/separation tank 60 is sized to allow sufficient retention time for floc formation and separation. There are three zones within the retention/separation tank 60. Solid contaminants and the floc will fall to the bottom 62 of the retention/separation and accumulate as sludge to be processed in phase VII of the treatment process. The rag layer or floating contaminants will be removed periodically and treated with the sludge in phase VII. The remaining water has most of the contaminants removed. The treated water is then pumped to the discharge tank 90 through the ozone 70 and activated carbon 80 process.

Treatment Phase V—Ozone. As discussed earlier, the oil/water separator 40 and the electrocoagulation process 50 will remove a majority of the contaminants from the wastewater. A small percentage of the organic and inorganic contaminants will not be removed and must be further processed to meet final discharge standards. Ozone ($O_3$) is an allotrope of oxygen ($O_2$). It is 1.5 times as dense as oxygen and 12.5 times more soluble in water. Ozone is injected into the wastewater prior to the activated carbon process 80. Ozone injection provides numerous benefits. Oxidation of residual hydrocarbons is the primary function of ozone in this process 70. Other characteristics of ozone are desirable. Disinfection by ozone takes place by rupture of the cell wall. Ozone levels of 0.4 ppm in wastewater for 4 minutes have been shown to kill any bacteria, virus, mold and fungus in the wastewater. To insure that no biological processes begin in the discharge tank 90 or on the activated carbon matrix 80, the water is recirculated through the ozone injection system 70, the activated carbon system 80 and the discharge tank 90. Any microorganism that passes through the system or enters from the outside is eradicated. The ozone is injected into the bottom of the clean water tank. This facilitates the efficiency of the transfer of $O_3$ into the water column. The ozone process 70 will react with contaminants that may remain in the wastewater creating less offensive compounds such as oxidizing sulfides to sulfates. Ozone will oxidize transition metals to higher oxidation states in which they usually form less soluble oxides, which are easier to filter. Finally, the ozone is used to regenerate the activated carbon 80. Any hydrocarbons not destroyed by the system will be adsorbed by the activated carbon 80. During periods when no hydrocarbons are present in the treated water, the recirculation process will carry ozonated water through the activated carbon 80. Hydrocarbons adsorbed by the activated carbon will be oxidized, thus regenerating the activated carbon 80.

Treatment Phase VI—Activated Carbon. Where ozone reacts rapidly with most simple aromatic compounds and unsaturated aliphatics, activated carbon will adsorb the larger organic chains and, depending upon the granular structure, will act as a filter. Activated carbon works by attracting and holding certain chemicals as water passes through it. Activated carbon is a highly porous material; therefore, it has an extremely high surface area for contaminant adsorption. Adsorption is caused by London Dispersion Forces, a type of Van der Waals force, which exists between molecules. The force acts in a similar way to gravitational forces between planets. Much like the electrocoagulation process 50, London Dispersion Forces are extremely short ranged and therefore sensitive to the distance between the carbon surface and the adsorbate molecule. They are also additive; meaning the adsorption force is the sum of all interactions between all the atoms. The adsorption process depends on the following factors:

1. Physical properties of the activated carbon, such as pore size distribution and surface area;

2. The chemical nature of the carbon source, or the amount of oxygen and hydrogen with which it is associated;

3. Chemical composition and concentration of the contaminant such as its molecular weight;

4. A higher number of functional groups such as double bonds or halogen compounds;

5. Increasing polarisability of the molecule, which is related to the electron clouds of the molecule;

6. The temperature and pH of the water; and

7. The flow rate or time exposure of water to the activated carbon.

Forces of physical attraction or adsorption of contaminants to the pore walls is the most important activated carbon filtration process 80. The amount and distribution of pores play key roles in determining how well contaminants are filtered. The best filtration occurs when pores are barely large enough to admit the contaminant molecule. Because contaminants exist in the wastewater in a range of sizes, they are attracted differently depending on pore size of the filter. In general, activated carbon filters are most effective in removing contaminates that have relatively large molecules. Water temperature, pH and exposure times are also considered in this process. The electrocoagulation process in phase III tends to lower the pH of the wastewater. Recirculation produces sufficient exposure to increase adsorption. Processes other than physical attraction also affect activated carbon filtration. The filter surface may actually interact chemically with organic molecules.

Also, electrical forces between the activated carbon surface and some contaminants may result in adsorption or ion exchange. The type of activated carbon to achieve maximum adsorption of the contaminants present is considered in this process.

Treatment Phase VII—Sludge Treatment. The residue from the treatment process in separator tank 40 and retention/separation tank 60 are removed and passed through a drying chamber (not shown). This portion of the process can be any process that will allow any residual water to pass while retaining solid particles, removed contaminates or floc formed by the various process such as a filter press, a vacuum box, centrifuge, drying bed or drying box. The solid material is treated to pass the paint filter test for disposal. Should contaminants removed from the wastewater result in a characteristic solid waste; the material is chemically treated to render it non-hazardous.

Treatment Phase VIII—Clean Water Discharge. The treated wastewater is held in a retention tank 90 for testing, then discharged. This tank 90 is sized to provide sufficient depth for the ozone contact time.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A system for treating wastewater containing organic and inorganic contaminants, free floating hydrocarbons and water, said system comprising:
   a holding tank;
   a separator in fluid communication with said holding tank;
   at least one electrocoagulation cell in fluid communication with said holding tank;
   a first ozone injector intermediate said holding tank and said at least one electrocoagulation cell;
   a separation tank in fluid communication with said at least one electrocoagulation cell;
   a carbon filter in fluid communication with said separation tank;
   a second ozone injector intermediate said separation tank and said carbon filter;
   a discharge tank in fluid communication with said carbon filter; and
   means for re-circulating wastewater through said discharge tank and said carbon filter.

2. The system of claim 1, further comprising:
   a sump capable of receiving said wastewater from at least one manifold port; and
   said holding tank in fluid communication with said sump.

3. The system of claim 1, further comprising:
   a dryer for drying solid material recovered from said at least one electrocoagulation cell and said separation tank.

4. The system of claim 3, further comprising:
   a diffuser intermediate said holding tank and said separator;
   said diffuser capable of slowing wastewater velocity to said separator.

5. The system of claim 3, further comprising:
   a detection system in said discharge tank;
   said detection system capable of detecting said contaminants in said wastewater;
   said detection system operable to selectively control said means for re-circulating wastewater.

6. The system of claim 1, wherein said means for re-circulating wastewater is selectively operable.

7. The system of claim 6, further comprising:
an insert in said separator;
said insert in fluid communication with an oil retention tank;
said insert capable of decanting said free floating hydrocarbons from said wastewater to said oil retention tank.

8. The system of claim 7, further comprising:
a dryer for drying solid material recovered from said at least one electrocoagulation cell and said separation tank.

9. The system of claim 8, further comprising:
a sensing and feedback system operable to detect wastewater decanted to said oil retention tank;
said sensing and feedback system operable to selectively interrupt fluid flow to said oil retention tank.

10. The system of claim 1, wherein said at least one electrocoagulation cell comprises at least two spaced plates;
said electrocoagulation cell capable of causing ionization of contaminants in said wastewater.

11. A system for treating wastewater containing organic and inorganic contaminants, free floating hydrocarbons and water, said system comprising:
a holding tank;
a separator in fluid communication with said holding tank;
at least one electrocoagulation cell in fluid communication with said holding tank;
a first ozone injector intermediate said holding tank and said at least one electrocoagulation cell;
a separation tank in fluid communication with said at least one electrocoagulation cell;
a carbon filter in fluid communication with said separation tank;
a second ozone injector intermediate said separation tank and said carbon filter;
a discharge tank in fluid communication with said carbon filter;
a detection system in said discharge tank; and
said discharge system capable of detecting said contaminants in said wastewater;
said detection system operable to selectively control a means for selectively re-circulating wastewater through said carbon filter and said discharge tank.

12. The system of claim 11, further comprising:
a diffuser in fluid communication with said holding tank and said separator;
said diffuser capable of slowing wastewater velocity to said separator.

13. The system of claim 12, further comprising:
an insert in said separator;
said insert in fluid communication with an oil retention tank;
said insert capable of decanting said free floating hydrocarbons from said wastewater to said oil retention tank.

14. The system of claim 13, further comprising:
a sensing and feedback system operable to detect wastewater decanted to said oil retention tank; and
said sensing and feedback system operable to selectively interrupt fluid flow to said oil retention tank.

15. The system of claim 11, further comprising:
a sump capable of receiving said wastewater from at least one manifold port; and
said holding tank in fluid communication with said sump.

16. A process for treating wastewater containing organic and inorganic contaminants, free floating hydrocarbons, and water, said process comprising:
collecting said wastewater in a holding tank;
feeding said wastewater to a separator;
decanting said free floating hydrocarbons from said wastewater;
collecting said free floating hydrocarbons for recycling;
transmitting said decanted wastewater to an electrocoagulation cell;
a first ozone addition step comprising injecting ozone to said wastewater intermediate said separator and said electrocoagulation cell;
applying a voltage differential across said electrocoagulation cell;
flowing said wastewater to a retention tank;
separating coagulated solids from said wastewater in said retention tank;
a second ozone addition step comprising injecting ozone into said wastewater intermediate said retention tank and said carbon filter;
filtering said wastewater through an activated carbon filter to remove said organic contaminants;
holding said filtered wastewater in a discharge tank;
detecting said organic and inorganic contaminants remaining in said wastewater;
selectively re-circulating said wastewater through said second ozone addition step, said filtering step, and said holding step until said remaining organic and inorganic contaminants are less than a determined concentration in said wastewater; and
discharging cleaned water.

17. The process of claim 16, wherein said feeding step further comprises:
diffusing said wastewater prior to said feeding step.

18. The process of claim 16, wherein said feeding step further comprises:
feeding said wastewater into a lower portion of said separator; and
filling said separator with said wastewater to a determined level.

19. The process of claim 18, wherein said decanting step further comprises:
drawing off said free floating hydrocarbons from atop said wastewater through a transmission line to an oil retention tank;
sensing said wastewater in said transmission line;
selectively interrupting said feeding step when said wastewater is sensed in said transmission line.

20. The process of claim 19, further comprising:
diffusing said wastewater prior to said feeding step.

21. The process of claim 16, further comprising:
drying solid particles resulting from said electrocoagulation step and said separator step.

* * * * *